(12) United States Patent
Gomez

(10) Patent No.: US 8,485,459 B2
(45) Date of Patent: Jul. 16, 2013

(54) INTENSE VORTEX DRYER, COMMINUTOR AND REACTOR

(76) Inventor: Rodolfo Antonio M Gomez, Urrbrae (AU)

(*) Notice: Subject to any disclaimer, the term of this patent is extended or adjusted under 35 U.S.C. 154(b) by 2425 days.

(21) Appl. No.: 10/482,907

(22) PCT Filed: Jul. 9, 2002

(86) PCT No.: PCT/AU02/00907
§ 371 (c)(1),
(2), (4) Date: Jan. 5, 2004

(87) PCT Pub. No.: WO03/006166
PCT Pub. Date: Jan. 23, 2003

(65) Prior Publication Data
US 2004/0182957 A1    Sep. 23, 2004

(30) Foreign Application Priority Data
Jul. 13, 2001 (AU) .................................. PR6350

(51) Int. Cl.
*B02B 1/00* (2006.01)
*B02C 11/08* (2006.01)
*B07B 4/00* (2006.01)

(52) U.S. Cl.
USPC ................... 241/39; 241/47; 241/54

(58) Field of Classification Search
USPC ....................... 241/5, 38, 39, 47–59
See application file for complete search history.

(56) References Cited

U.S. PATENT DOCUMENTS

| | | | | | |
|---|---|---|---|---|---|
| 2,316,207 | A | * | 4/1943 | Winter | 34/363 |
| 2,561,388 | A | * | 7/1951 | Lykken et al. | 209/714 |
| 2,660,564 | A | * | 11/1953 | Davis | 252/62 |
| 3,589,840 | A | * | 6/1971 | Murphy | 417/406 |
| 4,176,798 | A | * | 12/1979 | Talbott et al. | 241/39 |
| 4,391,411 | A | * | 7/1983 | Colburn | 241/1 |
| 4,923,124 | A | * | 5/1990 | Wiley | 241/5 |
| 5,695,130 | A | * | 12/1997 | Csendes | 241/19 |
| 2001/0042802 | A1 | | 11/2001 | Youds | |

FOREIGN PATENT DOCUMENTS

WO    WO 98/35756    8/1998
WO    WO 01/12332    2/2001

* cited by examiner

*Primary Examiner* — Bena Miller
(74) *Attorney, Agent, or Firm* — Klauber & Jackson LLC

(57) ABSTRACT

The invention concerns a vortex machine modified to intensify the vortex in the machine by installing inlet fans in addition to the main fan and modifying the configuration of the machine. Additional intensification of the vortex is achieved by introducing microwaves into the vortex machine. The vortex machine has a vortex tube, an inlet tube to the vortex tube at the inlet end, a feed inlet to the vortex tube between the inlet end and an outlet end and a fan rotor at the outlet en to draw air in a vortex through the vortex tube. An inlet fan in the inlet tube adapted to force air into the vortex tube. These modifications and additions achieve commercially viable capacities of the vortex machine in drying, grinding and process applications.

14 Claims, 5 Drawing Sheets

INTENSE VORTEX DRYER, COMMINUTOR AND REACTOR

FIELD OF INVENTION

This invention relates to a vortex machine that is modified to intensify the vortex forces while reducing the power consumption and the maintenance. Microwave energy may also be introduced into the vortex machine to further intensify vortexian forces for carrying out chemical reactions, comminution or drying difficult materials.

PRIOR ART

The cyclonic forces in a vortex have been known for several decades. FIG. 1 is a diagram of a conventional vortex machine made of a vortex tube 1, a flared inlet 2 and a flared connection 3 to the fan 8. Air 6 enters the flared inlet 2 and a cyclone is formed from the rotation of the rotor 4 of the fan 8. Solids or liquids 9 are fed into the vortex tube via feeder 5 and the air-solids or air liquid mixture 7 is discharged from the fan 8. Cyclonic action is considered to act on the solids or liquids in the vortex tube.

Phenomenon observed in a vortex are becoming more understood. U.S. patent application Publication No. 2001/0042802 in the name of Dr. Mark Youds shows a vortex machine and gives a substantial insight into the vortexian forces acting in a vortex. Dr. Youds describes the forces acting in a vortex as follows:

Cyclonic forces within the vortex which generate ultrasonic frequencies that result in electric and magnetic forces.

Reverse vortices which occur within the apparatus.

Within a boundary envelop, ultrasonic waves amplify and intensify vibrational ultrasonic waves producing a sound pressure of about 7,500 to 147,000 psi and increasing the temperature at a micro level by many thousands of degrees Fahrenheit but not more than about 10 degrees overall.

Shear forces acting in the vortex are capable of producing hydroxide ions, negative hydroxyl ions, hydrogen radicals, ozone, and hydrogen peroxide from water.

Rocks are comminuted due to dissociation of oxygen in the fissures and the subsequent explosion or release of energy when the oxygen ions associate. The presence of water in fissures create shock waves in the rock aiding comminution.

Dr. Youds' apparatus has 8 to 12 rotor blades and the diameter of the vortex tube is ⅓ of the diameter of the fan rotor. The dimensions and rotor speed are related in a given formula. The rotor has a diameter of 612 mm and a speed of up to 7,222 rpm requiring a motor of 200 kilowatts.

WIPO publication No WO01/12332 in the name of Helix Comminution with Dr. Youds as an inventor discloses a vortex apparatus for processing and treating sewage. The specification claims to have dried sewage pretreated in a centrifuge from 21% solids to 70 to 95% solids depending on the ambient air temperature at a rate of 4,100 kilograms per hour.

BRIEF DESCRIPTION OF THE INVENTION

In one form, therefore, the invention is said to reside in a vortex machine having a vortex tube, the vortex tube having an inlet end and an outlet end, an inlet tube to the vortex tube at the inlet end, a feed inlet to the vortex tube between the inlet end and the outlet end and a fan rotor at the outlet end to draw air in a vortex through the vortex tube, characterised by an inlet fan in the inlet tube adapted to force air into the vortex tube.

Preferably the inlet fan is an axial fan and the fan rotor is a centrifugal fan.

Preferably the vortex machine includes a flared inlet duct upstream of the inlet fan and a flared outlet duct between the vortex tube and the fan rotor.

The fan rotor is preferably mounted in a housing or shroud and provides for tangential delivery of treated or processed product. Downstream from the fan rotor housing or shroud may be separation equipment such as cyclones or filters to separate treated or processed product from air.

The inlet fan may be adapted to be rotated in the same or in the opposite direction to the direction of the rotation of the fan rotor.

In one embodiment the inlet fan may include an inner inlet fan and an outer inlet fan, the inner inlet fan being adapted to rotate in the opposite direction to the direction of the rotation of the outer inlet fan. Each of the inner inlet fan and the outer inlet fan may be axial flow fans. The inner inlet fan and the outer inlet fan may be operated on concentric axes and have their own fan shrouds or housings.

Preferably the feed inlet is adjacent the inlet end of the vortex tube and solids or liquids or a mixture of solids and liquids is fed into the vortex tube through the feed inlet. The feed inlet can include a inlet hopper and a feeder selected from a star feeder, worm or screw feeder, piston feeder, belt feeder, metering pump, or vibrating feeder. The solids, or liquids, or mixture of liquids and solids may be fed into the vortex tube in an even constant manner or pulse fed in sympathy with vortex harmonics.

There may be further included wear liners in the vortex tube and in the flared outlet duct. The wear liners may be plates welded or otherwise fastened or affixed to the inner surface of the vortex tube and the conical portions. Wear liners may also be placed in the fan housing and on the fan blades. The plates may be metal such as steel or ceramic or other suitable material. Alternatively the inner surface of the vortex tube, the conical portions, the fan housing and the fan blades may be hard faced with welding or the like.

In one embodiment the flared outlet duct between the vortex tube and the fan rotor includes peripheral openings and an annular collecting ring around the peripheral openings to allow coarse solids to be removed from the vortex machine and collected into a output hopper.

There may be a frusto-conical diameter reducing portion between the vortex tube and the flared outlet duct.

Blades of the fan rotor can extend into the flared outlet duct to help enhance the vortex and the fan rotor can include a deflector cone to improve fluid flow.

There may be further included means to supply microwaves into the vortex tube. The means to supply microwaves into the vortex tube may be a microwave guide and window in the tube or a shielded cable and an antennae located inside the tube. The microwaves introduced into the vortex machine may have a frequency from 800 to 22,000 megahertz and the microwaves may be introduced into the vortex machine at a steady rate or in a pulsed manner or in a combination of both steady rate and pulsed manner.

A muffler arrangement may be fitted to the inlet of the vortex tube. The muffler arrangement may comprise a tube having baffles consisting of alternate circular plates and rings. The muffler arrangement can include at least two inlet pipes connected tangentially to a central pipe connected to the inlet tube and each of the inlet pipes and central pipe have baffles consisting of alternate circular plates and rings.

Sound deadening insulation may be provided on the vortex tube and other portions of the vortex machine such as on the fan housings. Thermal insulation may also be provided.

There may be further including means to heat or cool inlet air or gas before it enters the vortex tube.

BRIEF DESCRIPTION OF THE DRAWINGS

This then generally describes the invention but to assist with understand in reference will now be made to the accompanying drawings of preferred embodiments.

In the drawings.

DESCRIPTION OF PREFERRED EMBODIMENTS

A description of the drawings is given below and then the embodiments of invention and their operation will be discussed in more detail.

Figure 1:
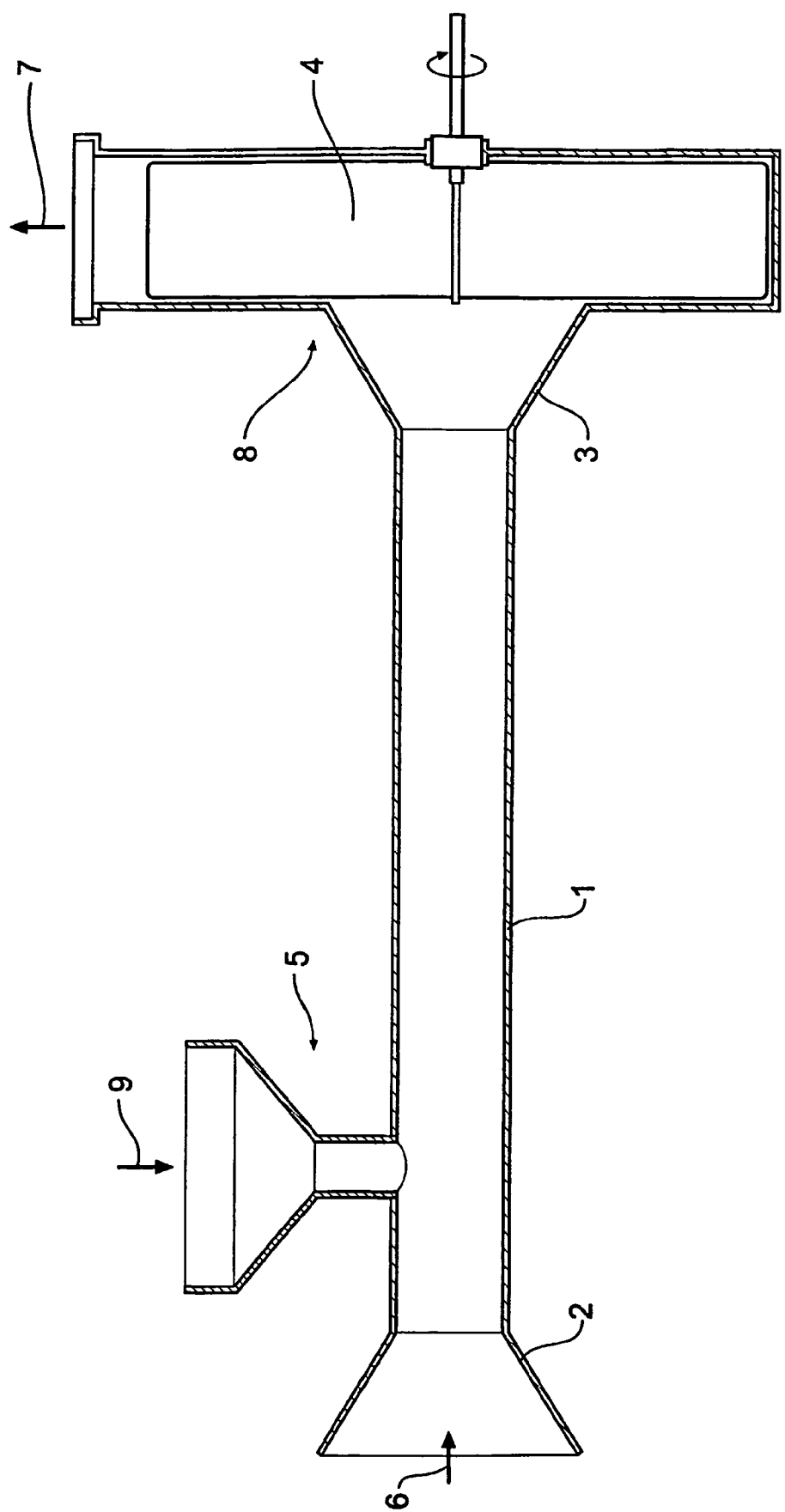
FIG. 1 shows an example of a prior art vortex machine.

FIG. 1 is a conventional vortex unit where cyclonic forces are produced in the vortex tube 1 arising from the rotation of the rotor 4 in the main fan 8. The main fan 8 is generally of the centrifugal fan type. Air 6 is sucked into the flared inlet 2 while solids or liquids 9 are fed into the vortex tube 1 through hopper 5.

Figure 2:
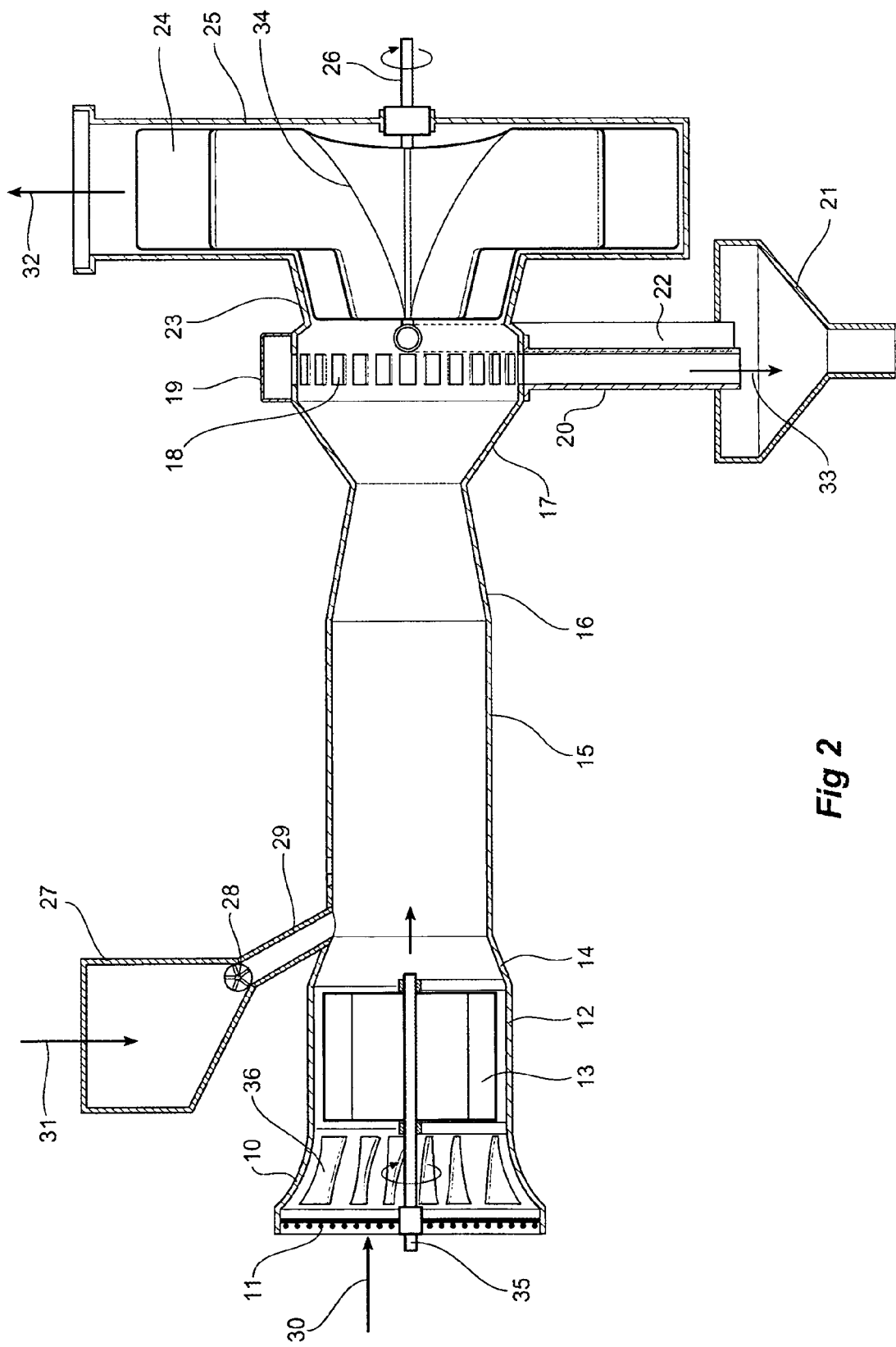
FIG. 2 shows a first embodiment of a vortex machine according to the invention.

FIG. 2 is the first embodiment of this invention. A flared inlet 10 with a screen 11 and stationary vanes 36 to direct air in sympathy with the rotation of the inlet fan 13 lead the air into the inlet fan housing 12. The inlet fan is preferable of the axial flow type. The inlet fan 13 driven by shaft 35 rotates in the same or opposite direction to the rotation of the main fan rotor 24. The cylindrical inlet fan housing 12 reduces to the same diameter as the cylindrical section of the vortex tube 15 with conical section 14 to intensify the vortex. The intense cyclonic forces in the cylindrical section 15 are further intensified by reducing the diameter of the cylindrical section 15 by reducing conical section 16. The end of conical section 16 flares out into expanding conical section 17 where there may be openings 18 at the end of this conical section. The openings may be from zero size to a dimension required for any particular application. Alternative location of openings 18 is at the end of conical section 16. An annular housing 19 collects solids or liquids passing thorough the openings 18 and this material is led to the hopper 21 through tube 20. A tube 22 may connect the hopper 21 to section 17 to balance air pressure in the hopper 21. Another expanding conical piece 23 connects the end of section 17 to the main fan housing 25. The rotor blades 24 are extended to the beginning of expanding conical piece 23 to intensify the formation of the vortex. The rotor blades are connected to an axially mounted deflector cone 34 to improve the fluid flow in the main fan 25. The tip speed of the main fan when operating would be close to the speed of sound. Feed 31 in the hopper 27 is fed into the vortex tube 15 through feeder 28 and feeder tube 29. The feeder 28 may be a star feeder, belt, screw or worm, piston, or vibrating feeder for solids or a metering pump or other pump for liquids. The feed rate may be uniform or pulsed in sympathy with the harmonics in the vortex or a combination of these manners of feeding.

Figure 3:
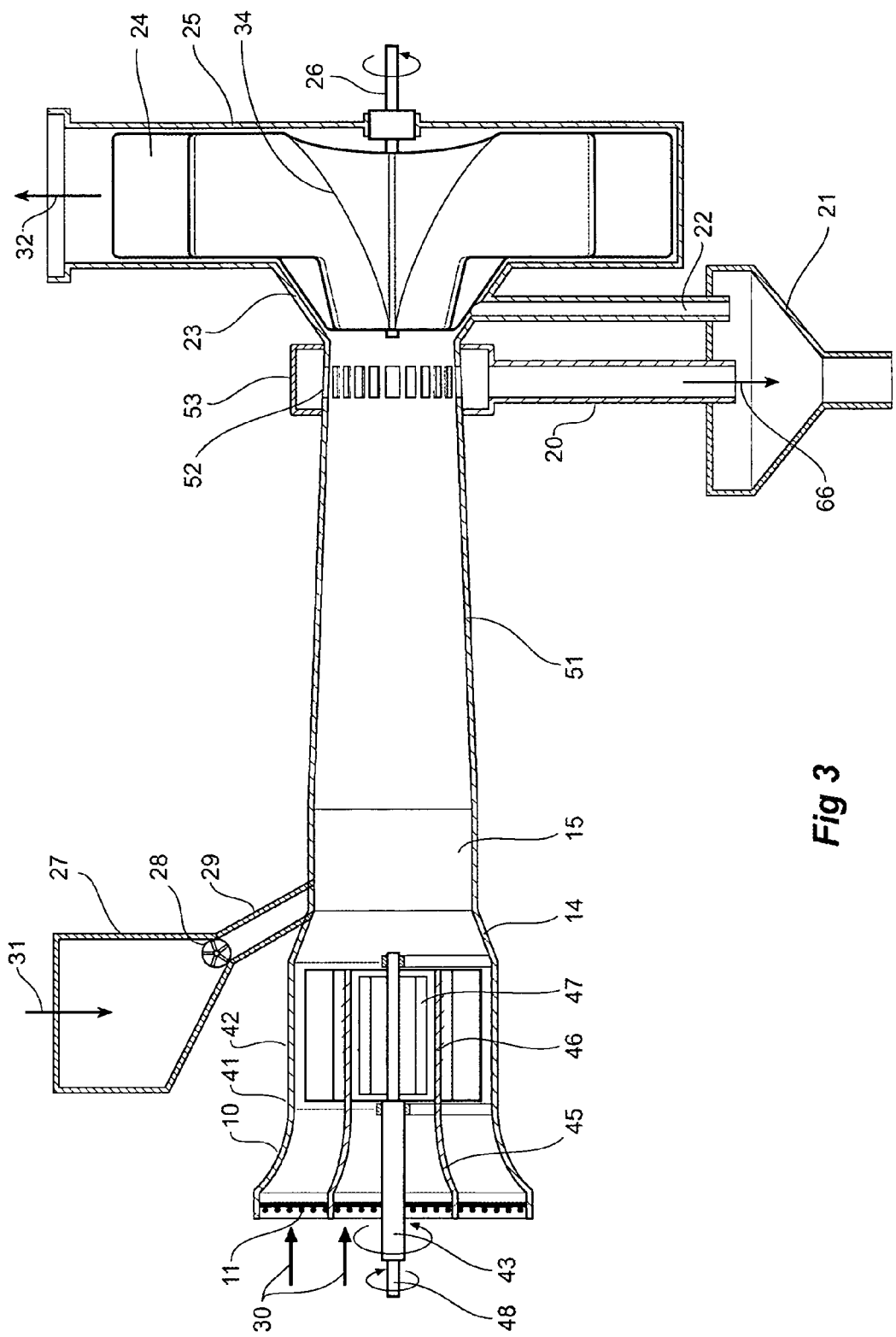
FIG. 3 shows a further embodiment of a vortex machine according to the invention.

The embodiment shown on FIG. 3 is similar to FIG. 2 and the same reference numerals are used for the same components. In this embodiment there are two inlet fans. The inner inlet fan 47 contained in its shroud or housing 46 is driven by shaft 48 in a direction that is opposite to the direction of the rotation of the rotor 24 of the main fan 25. The outer fan 42 is contained in its shroud or housing 41 and driven by concentric shaft 43 in the same direction as the rotor of the main fan 24. In this embodiment there is a long reducing conical section 51 after a shorter vortex tube portion 15. The downstream end of conical section 51 has openings 52. An annular housing 53 collects solids or liquids passing through the openings 52 and this material is led to the hopper 21 through tube 20. A tube 22 may connect the hopper 21 to expanding conical section 23 to balance air pressure in the hopper 21.

Figures 4A, 4B:
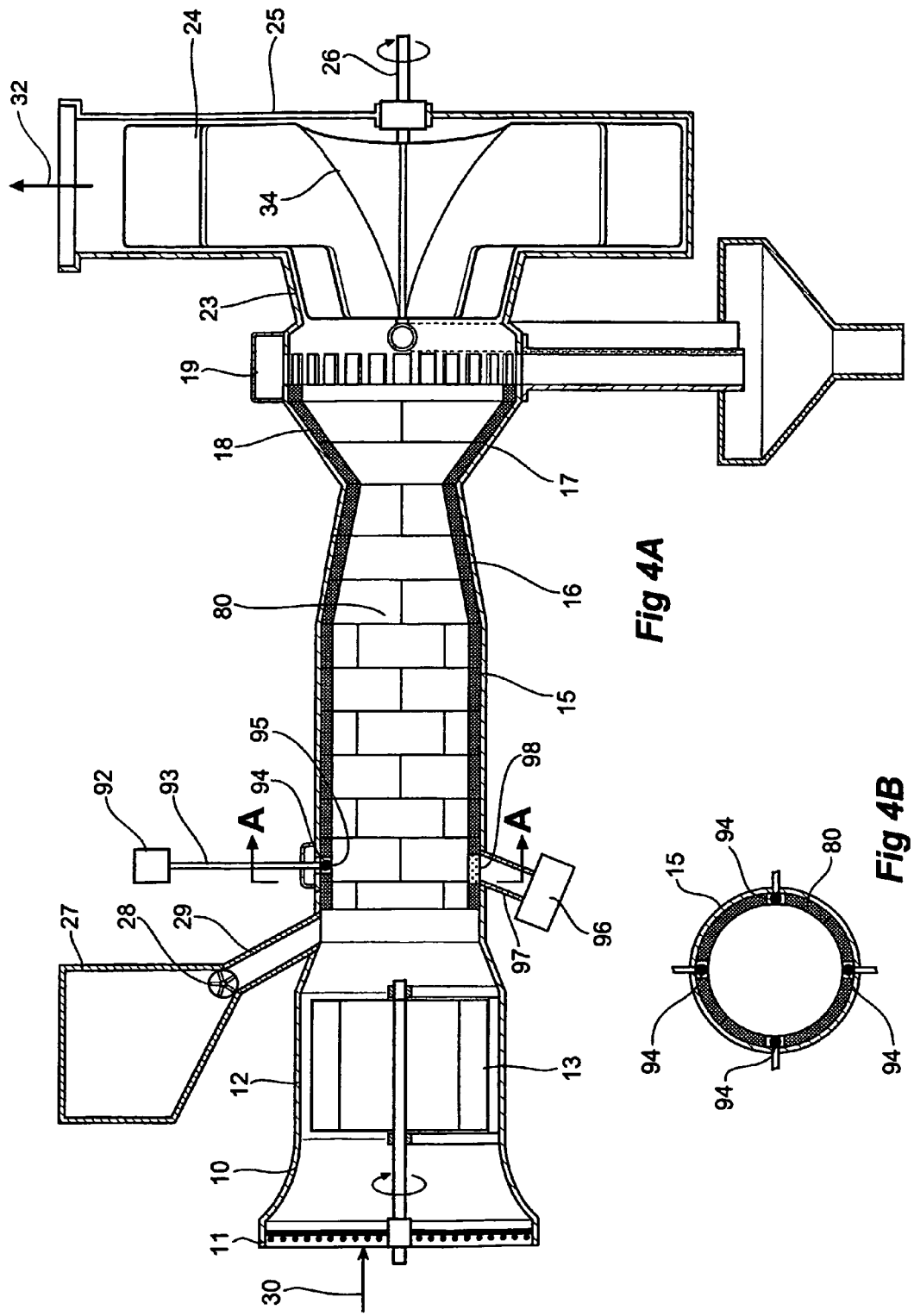
FIGS. 4A and 4B show a further embodiment of a vortex machine according to the invention.

FIGS. 4A and 4B shows a vortex machine of the embodiment similar to FIG. 2 and the same reference numerals are used for the same components. In this embodiment microwave units are installed to introduce microwave energy into the vortex machine. Air is fed to the vortex tube via the flared inlet 10 while solids or liquid is fed into the cylindrical section 15. Microwaves may be introduced into the cylindrical section 15 or into the conical sections 16 or 17 as shown in FIG. 4B. There may be one or more microwave installations and different methods of introducing microwaves. Microwaves may be introduced from generator 96 through conventional wave guide 97 and window 98 or from generator 92 via a shielded cable 93 and to an antennae 94 protected by a microwave transparent and abrasion resistant cover 95 located inside the cylindrical section 15.

In this embodiment wear plates 80 are provided on the inside of the cylindrical portion 15 and the reducing conical section 16 and expanding conical section 17. Wear plates (not shown) may also be placed within the fan housing 25.

Figures 5A, 5B:
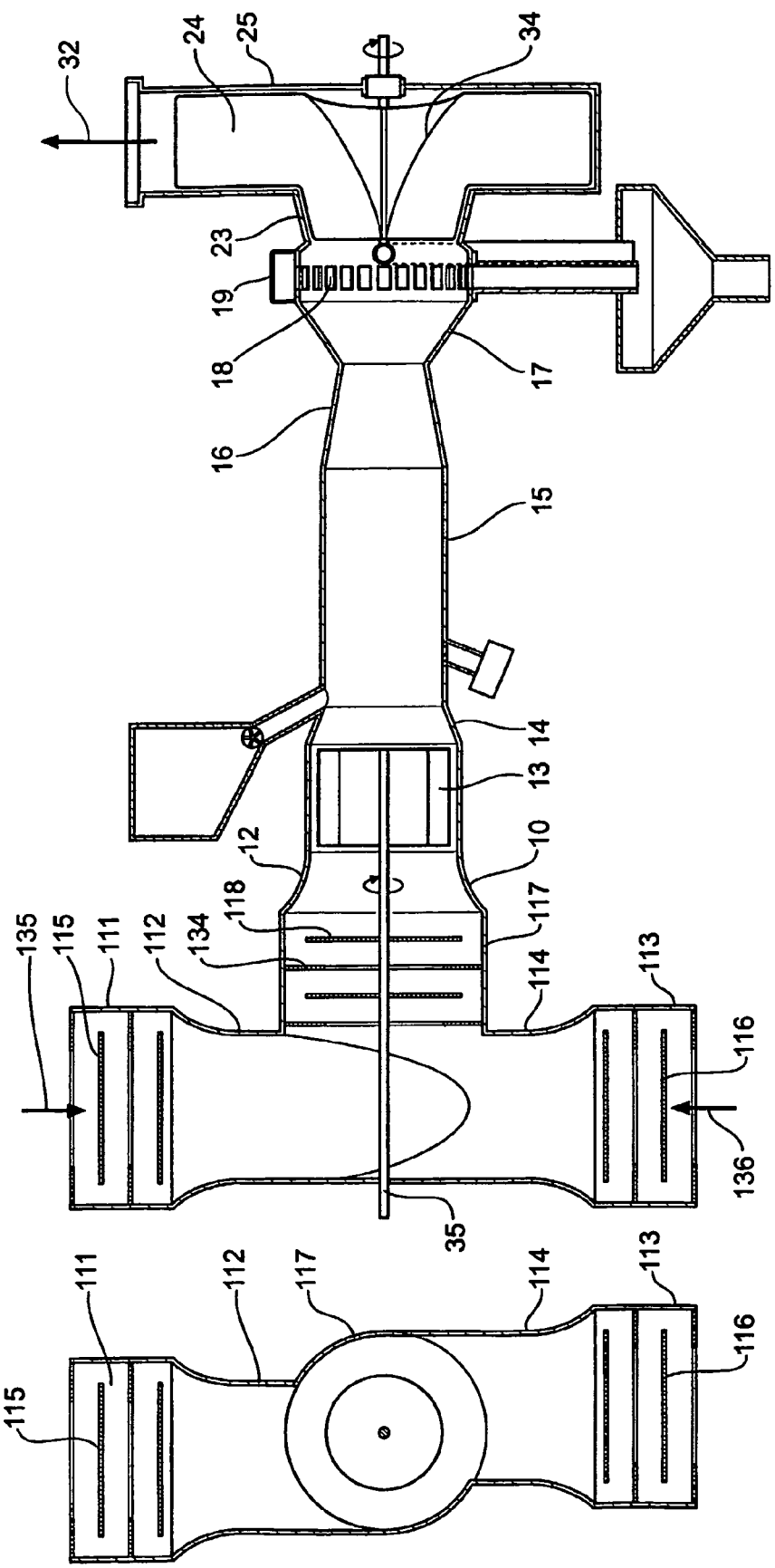
FIGS. 5A and 5B show a still further embodiment of a vortex machine according to the invention.

FIGS. 5A and 5B show an embodiment of this invention similar to FIG. 2 and the same reference numerals are used for the same components. This embodiment of vortex machine is fitted with a muffler at the inlet end of the vortex machine. There may be one or more intake pipes 111 and 113 connected to pipes 112 and 114 that are tangentially connected to the main pipe 117. Baffles 115, 116, and 118 are installed to muffle the high pitch noise from the vortex machine but do not impede the rotating motion of the air 135 as it enters the flared inlet 10 of the vortex machine. In this embodiment the baffles are alternate rings or annular plates and discs. Baffles 134 may also be helical to further enhance the rotation of the air as it enters the flared inlet 10. The noise at the discharge end of the main fan will be muffled by the separation equipment (not shown). The whole unit comprising the muffler and vortex machine may be vertical or horizontal.

The use of this invention is expected increase the capacity of the vortex machine by intensifying the vortexian forces through modifying the mechanical configuration of the apparatus and introducing microwave energy into the vortex machine.

FIG. 2 shows one embodiment of this invention. The vortexian forces in prior art devices reduce in intensity as the distance increases from the main fan. This is corrected in this invention by installing a fan 13 in a housing 12 at the inlet of the vortex tube rotating in the same direction as the main fan 25. In some applications, the inlet fan may be rotating in the opposite direction as the main fan. This inlet fan housing 12 is reduced in diameter in the section 14 to the same diameter as the vortex tube, further intensifying the vortex in the vortex tube. Solids or liquid feed is introduced at the beginning of the vortex tube through feed pipe 29. The next modification involves reducing the diameter of the vortex tube 16 before expanding the vortex 17. In applications such as grinding or comminution of rocks, the centripetal forces acting in the vortex may not be sufficient to keep the solids from rubbing on the cylindrical section 15, the reducing conical section 16 and expanding conical section 17. Abrasion resistant liners (see FIG. 4A) may be installed inside these sections to counter the abrasion. Towards the end of the cone 17, there are openings 18 of varying size from as low as no opening to larger sizes to suit a particular applications. The objective is to remove coarse solids that may cause abrasion of the fan blades. The coarse solids are collected in an annular ring 19 and delivered to a hopper 21 through pipe 20. A tube 22 connects the hopper 21 to the conical section 17. The openings 18 may also be located at the end of the conical section 16. The expanding conical section 17 is connected to the main fan housing 25 by expanding conical section 23. Another feature to intensify the vortex is the extension of the fan rotor blades 24 to the beginning of conical section 23. The rotor blades 24 are connected to an axial deflector cone 34 to improve the fluid flow through the main fan. The shape, diameter and rotational speed of inlet fan 13 can be varied in relation to the main fan 25 to achieve the desired harmonics in the vortex. Air into the inlet fan may at ambient or be cooled or heated and pass through a screen 11 and then through a reducing cone 10 fitted with stationary vanes to start turning the air in the direction of the inlet fan. Solid or liquid 31 is fed into the feed hopper 27 and metered into the feed pipe 29 by a feeder 28 that may be a star feeder, a screw or worm feeder, a piston feeder, or a vibrating feeder. The discharge 32 from the fan 25 may be treated in a cyclone or electrostatic precipitator to separate the solid or liquid component from the gas.

FIG. 2 shows the vortex machine in a horizontal position but the vortex machine may be vertical, horizontal or inclined.

FIG. 3 is another embodiment of this invention that is similar to the embodiment shown on FIG. 2 except that there is another inner fan 47 at the inlet rotating in a direction opposite to the rotation of the main fan rotor 59. The objective is to enhance the counter-vortex in the vortex tube while at the same time enhancing the intensity of the main vortex with the outer inlet fan 42. The inner inlet fan 47 is driven by shaft 48 and has a separate housing 46. The outer inlet fan 42 is driven by shaft 43 and has its housing 41. The features and operation of this embodiment are similar to that shown in FIG. 2 except for the presence of the inner fan rotating in the opposite direction to the main fan.

The other embodiment of this invention to improve the commercial performance of the vortex machine is the application of microwave energy into the vortex apparatus. Microwave energy may be added at any part of the vortex machine to enhance the vortexian forces acting on the solids, liquids, or gas fed into the vortex tube. An example using the embodiment in FIG. 2 is shown on FIGS. 4A and 4B. Microwaves are shown being introduced in the cylindrical section 15 just after the solids feed pipe. Microwaves may be introduced from generator 96 through conventional wave guide 97 and window 98 or from generator 92 via a shielded cable 93 and to an antennae 94 protected by a microwave transparent and abrasion resistant cover 95 located inside the cylindrical section 80. The microwave feed may be distributed around the cylindrical section as shown in FIG. 4B and there may be several similar sections along the cylindrical section 15 or the conical sections 16 and 17. The microwave energy may have a frequency from 800 to 22,000 megahertz. The microwave energy may also be applied in a steady manner or in pulses in sympathy with the harmonics in the vortex.

Those who have operated commercial size vortex machines are aware of the high pitch sounds emanating from the vortex machine during operation. One embodiment of this invention is to reduce this noise and at the same time add to the intensity of the vortex. This is achieved by the arrangement of the muffler shown on FIGS. 5A and 5B. Two or more inlet tubes 111 and 113 are fed tangential to another pipe 117. Baffles 115, 116, and 118 in pipes 111, 113, and 117 muffle sound from the vortex machine but allow the inlet air to rotate in the direction of the inlet fan 121. The shaft 110 of inlet fan 121 may be extended or a right angle drive may be used dosed to the inlet fan. Heating or cooling arrangements may also be incorporated in this muffler arrangement.

The above modifications to a conventional vortex machine are aimed at increasing the capacity of a vortex machine similar to that described by Dr. Youds from 4,100 kilograms per hour to about 20,000 to 50,000 kilograms per hour. This range of capacity for one unit is estimated to be that required to make vortex machines commercially viable in drying of coal or sewage or in chemical reactions.

The intense vortex described in this invention are designed to carry out commercial scale drying particularly of difficult materials; grinding of materials; and chemical reactions.

In chemical applications, the conversion of kerogens in oil shale or similar marine material to petroleum is a major application of this invention. Another potential and important application is the processing of carbon dioxide gas to prevent this gas from contributing to the greenhouse effect in earth's atmosphere.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. A vortex machine having a vortex tube, the vortex tube having an inlet end and an outlet end, an inlet tube to the vortex tube at the inlet end, a feed inlet to the vortex tube between the inlet end and the outlet end and a fan rotor at the outlet end to draw air in a vortex through the vortex tube, characterised by an axial inlet fan in the inlet tube adapted to force air into the vortex tube.

2. A vortex machine as in claim 1 including a flared inlet duct upstream of the inlet fan.

3. A vortex machine as in claim 1 including a flared outlet duct between the vortex tube and the fan rotor.

4. A vortex machine as in claim 3 wherein blades of the fan rotor extend into the flared outlet duct to help enhance the vortex.

5. A vortex machine as in claim 1 wherein the inlet fan is adapted to be rotated in the same or in the opposite direction to the direction of the rotation of the fan rotor.

6. A vortex machine as in claim 1 wherein the inlet fan includes an inner inlet fan and an outer inlet fan, the inner inlet fan being adapted to rotate in the opposite direction to the direction of the rotation of the outer inlet fan.

7. A vortex machine as in claim 6 herein the inner inlet fan and the outer inlet fan are axial flow fans.

8. A vortex machine as in claim 6 wherein the inner inlet fan and the outer inlet fan are operated on concentric axes and have their own fan shrouds or housings.

9. A vortex machine as in claim 1 wherein the feed inlet is adjacent the inlet end of the vortex tube and solids or liquids or a mixture of solids and liquids is fed into the vortex tube through the feed inlet.

10. A vortex machine as in claim 9 wherein the feed inlet includes an inlet hopper and a feeder selected from a group comprising a star feeder, worm or screw feeder, piston feeder, belt feeder, metering pump, or vibrating feeder.

11. A vortex machine as in claim 9 wherein the solids, or liquids, or mixture of liquids and solids are fed into the vortex tube in an even constant manner or pulse fed in sympathy with vortex harmonics.

12. A vortex machine as in claim 1 where the fan rotor includes a deflector cone to improve fluid flow.

13. A vortex machine as in claim 1 further including means to heat or cool inlet air or gas before it enters the vortex tube.

14. A vortex machine as in claim 1 wherein the fan rotor is a centrifugal fan.

\* \* \* \* \*